United States Patent
Wissmach et al.

(10) Patent No.: US 6,520,270 B2
(45) Date of Patent: Feb. 18, 2003

(54) DEPTH STOP ASSEMBLY FOR A HAND-HELD POWER TOOL

(75) Inventors: Walter Wissmach, Munich (DE); Ferdinand Kristen, Gilching (DE); Hans-Werner Bongers-Ambrosius, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 2 days.

(21) Appl. No.: 09/866,190

(22) Filed: May 25, 2001

(65) Prior Publication Data

US 2001/0052418 A1 Dec. 20, 2001

(30) Foreign Application Priority Data

Jun. 14, 2000 (DE) .......................................... 100 29 134

(51) Int. Cl.[7] ................................................. B27C 3/08
(52) U.S. Cl. ............................. 173/170; 173/2; 173/4; 173/6; 173/20; 411/81; 411/378
(58) Field of Search ................................ 173/1, 2, 4, 6, 173/20, 217, 170; 408/16; 235/375; 227/142; 411/81, 378

(56) References Cited

U.S. PATENT DOCUMENTS

| | | | | |
|---|---|---|---|---|
| 5,161,922 A | * | 11/1992 | Malloy | 324/207.16 |
| 5,434,572 A | * | 7/1995 | Smith | 342/44 |
| 5,484,026 A | * | 1/1996 | Susaki et al. | 173/11 |
| 5,918,685 A | * | 7/1999 | Ulbrich et al. | 173/15 |

OTHER PUBLICATIONS

Publication No. US 2002/0033267 A1, Mar. 21, 2002, Schweizer et al. 173/2.*

* cited by examiner

Primary Examiner—Rinaldi I. Rada
Assistant Examiner—Thanh Truong
(74) Attorney, Agent, or Firm—Sidley Austin Brown & Wood, LLP

(57) ABSTRACT

A depth assembly for use with a hand-held power tool (2) and including a motorized control unit for adjusting a position of a depth-setting member (3) and connectable with an energy source (4) which supplies power thereto, and a micro-controller (6) for controlling the operation of the control unit (5) and connected with a length-determining sensor.

11 Claims, 1 Drawing Sheet

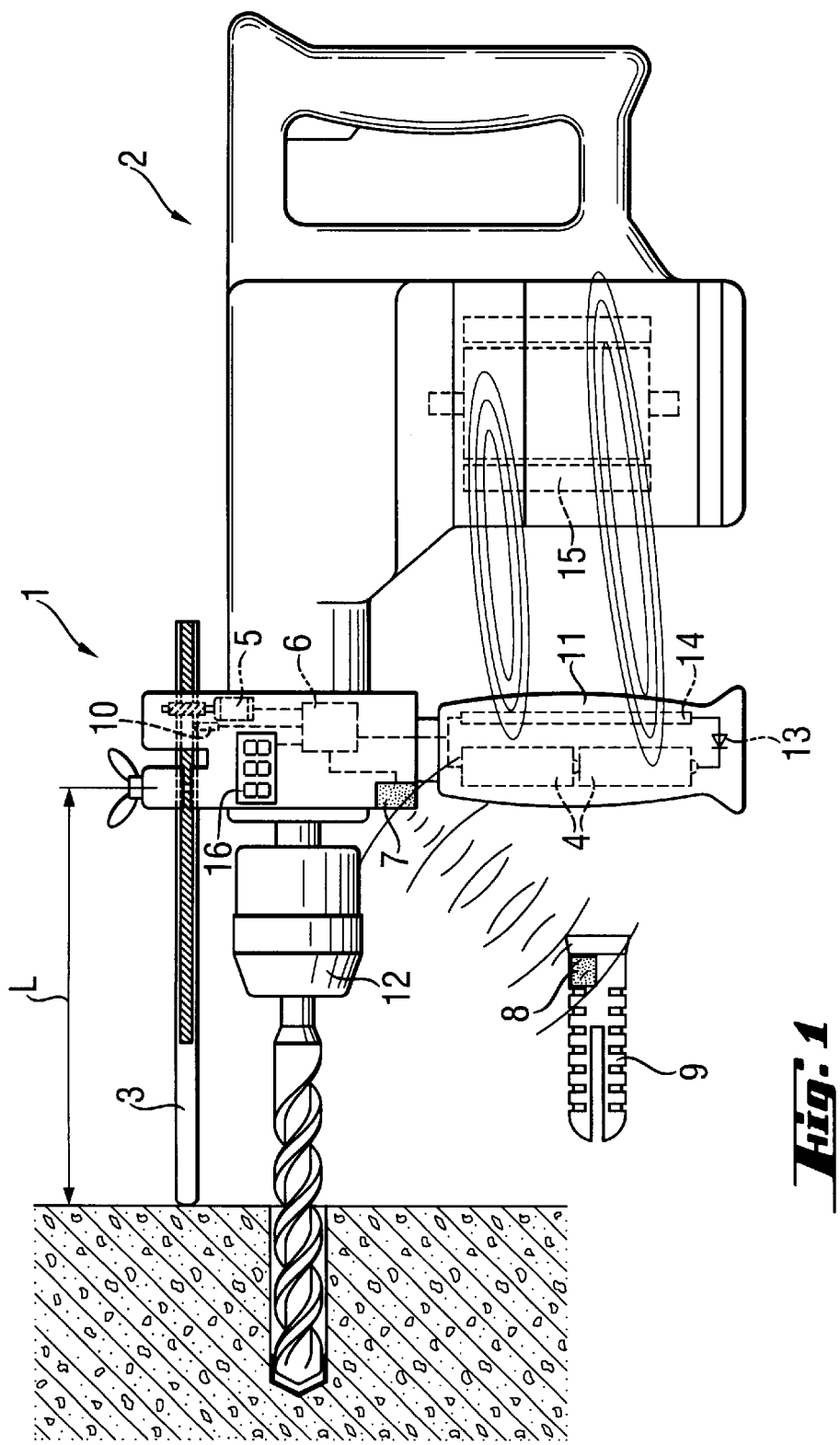

DEPTH STOP ASSEMBLY FOR A HAND-HELD POWER TOOL

BACKGROUND OF THE INVENTION

1. Field of the Invention

The present invention relates to a depth stop assembly for rotatable and/or percussion hand-held power tools such as hand-held drilling tools or hammer drills for forming blind bores, in particular, in stone, in which fastening elements are received. The present invention also relates to a fastening element to be inserted in a bore produced with a hand-held tool equipped with the depth stop assembly, and to a method of adjusting the position of the depth stop assembly.

2. Description of the Prior Art

In many applications, a precise depth of a blind bore has to be provided in order to insure an optimal anchoring of a fastening element subsequently placed into the blind bore. To this end, the removal of the material from a bottom of the blind bore should stop at a predetermined penetration depth.

The establishing of a predetermined depth of a blind bore can be achieved by ending the rotational or percussion movement and/or by ending the advance of the working tool. The advance can be rerouted to another location on the constructional component.

For limiting the penetration depth, U.S. Pat. No. 4,890,779 discloses the use of special setting tools which are inserted in the chuck of a hand-held tool and which are provided with a depth stop. The drawback of this special setting tools consists in their limited application, as they are intended for use in limited specific cases.

U.S. Pat. No. 3,633,682 discloses a depth stop for drill hammers and formed as a deflection-resistant, rod-shaped, depth-setting member displaceable along the tool axis. Advantageously, the depth stop is mounted on an auxiliary handle of the hand-held tool. A mechanical contact of the depth-setting member with a constructional component, primarily a wall, simply and effectively prevents further penetration of the working tool beyond the depth predetermined by the depth stop. The drawback of the depth stop disclosed in U.S. Pat. No. 3,633,682 consists in that the depth stop is adjusted manually and, thereby, is error prone.

According to U.S. Pat. No. 4,436,460, for forming a bore in a cylinder, the position of the working tool is measured and evaluated. This stand-dependent special case is not applicable to hand-held tools.

U.S. Pat. No. 4,717,291 discloses a depth stop for a hand-held tool and which includes a non-rotatable, sleeve-shaped stop displaceable along the tool axis. The position of the stop is adjusted, in accordance with the working tool length, by a depth controlling unit provided with a screw gear. A mechanical contact with the constructional component interrupts the penetration of the working tool. The drawbacks of this depth stop consist in the required sleeve shape of the stop member which surrounds the working tool, and in having a need to provide a screw gear having increased dimensions.

WO 86/03314 discloses use of labels having a bar code for identification. WO 86/02186 discloses the use of passive film resonant circuits for identification. WO 89/05984 discloses the use of an externally driven active transponder for identification. The use of bar-coded labels, resonant circuits, transponders for identification, for answering inquiries, for storing data is well known, and they can be produced in large number in mass production. An object of the present invention is a depth stop assembly for a hand-held power tool with which, during boring of a blind hole for receiving a fastening element, the hole depth is limited to a value associated with the length of the fastening element.

SUMMARY OF THE INVENTION

This and other objects of the present invention, which will become apparent hereinafter, are achieved by providing a depth stop assembly including a rod-shaped, deflection-resistant, depth-setting member supported for a limited movement parallel to an axis of the power tool and adjustable in accordance with a stop length associated with a fastening element insertable in the blind bore, a motorized control module associated with the depth-setting member and connectable with an energy source, a length-determining sensor associated with the depth-setting member, a transceiver unit for contactless reading of an identification of identification means connected with the fastening element, and a micro-controller for controlling operation of the control module and connected with the transceiver unit and the sensor to provide for adaptive adjustment of the stop length. Thereby, the blind bore depth is limited in accordance with the stop length.

Advantageously, the control module is formed as a step motor on the output shaft of which, a worm gear, which cooperates with a rack that forms part of the depth-setting member, is supported.

The length-determining sensor is advantageously formed as a magnetic sensor for determining a total length or is formed of a plurality of incremental magnetic strips characterizing the length of the depth setting member.

Advantageously, the identification means is formed as a bar code, film resonant circuit, or a transpoder and is located on or in the fastening element in an unimportant, for its functioning, location. In addition to data indicating the blind bore depth, the indentification means can contain other data such as a blind bore diameter, length of the working tool, or the type of the working tool. All of the data are displayed on a display which is controlled by micro-controller and which is provided on a housing containing the transceiver unit and the micro-controller. The transceiver is formed in accordance with the type of the identification means and can be formed as a laser scanner/light receiver unit, a radio transceiver, or a radio transceiver with a modulated carrier frequency.

Advantageously, the depth stop assembly is mounted adjacent to the chuck of a hand-held tool and, advantageously, is secured with appropriate attachment means on an auxiliary handle of the hand-held tool.

Advantageously, the depth stop assembly is connected with the energy source, which is integrated in the hand-held tool, by a sliding or plug contact provided in the region of the attachment of the depth stop assembly in vicinity of the chuck or by a flexible conductor with a plug connector. As energy source, advantageously, a battery, an accumulator, or a storing capacitor can be used, which, advantageously, is integrated in the auxiliary handle of the hand-held tool.

Advantageously, the energy source, which is formed as an accumulator or a storing capacitor, is connected, by a power converter, with a coil formed as a secondary winding of transformer and through which a magnetic flux is generated by a coil formed as a primary winding, passes. The primary coil represents a part of the electrical drive of the hand-held tool and can be formed, e.g., as a stator winding. Such an arrangement insures an appropriate energy supply of the depth stop assembly.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS:

Single FIGURE of the drawings shows a schematic side view of a hand-held power tool with a depth stop according to the present invention.

DETAILED DESCRIPTION OF THE PREFERRED EMBODIMENT

A depth stop 1 according to the present invention, which is shown in the drawing, is secured on a hand-held power tool 2 and extends parallel to the axis of working tool secured in the power tool chuck 12. The depth stop 1 has a stop length L and includes a deflection-resistant rod-shaped, depth-setting member 3 supported with a possibility of a limited displacement in a longitudinal direction. For adjusting the position of the rod-shaped member 3, there is provided a motorized control module 5 which is formed as a step-motor. A worm gear, which is secured on the output shaft of the step-motor, cooperates with a rack, which forms part of the rod-shaped depth-setting member 3. For supplying power to the control module 5, there is provided an energy source 4. A micro-controller 6 connects the control module 5 with a transceiver unit 7 which is formed as a radio transceiver having a variable frequency and which is designed for identification of the identification means 8 formed as a film resonant circuit. The identification means' 8 is connected with a dowel-shaped fastening element, 9 located in a transmission range of the transceiver unit 7. A length-determining sensor 10, which is formed as a magnet sensor and is connected with the micro-controller 6, is associated with the rod-shaped member 3. The depth stop I is secured with an attachment element of the auxiliary handle 11 in the vicinity of the chuck 12 for receiving the working tool. The energy source 4, which is formed as a storing capacitor, is integrated into the auxiliary handle 11. A power converter 13 connects the energy source 4 with a coil 14 formed as a secondary winding of a transformer. The coil 14 is interspersed by a magnetic flux produced by a starter winding of an electrical drive of the power tool 2 and which serves as a primary winding of an electrical drive of the power tool 2 and which serves as a primary winding of the transformer and is formed as a field coil 15. Both the field coil or winding 15 and the coil 14 form a power supply for feeding power to the energy source 4. For displaying identification data, a display 16 is provided on the depth-stop housing. The display 16 is connected with the micro-controller 6.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A depth stop assembly for use with a hand-held power tool (2) for setting a depth of a blind bore formed with the power tool, the depth stop comprising a rod-shaped, deflection-resistant, depth-setting member (3) supported for a limited movement parallel to an axis of the power tool and adjustable in accordance with a stop length (L) associated with a fastening element (9) insertable in the blind bore; a motorized control unit (5) associated with the depth-setting member (3) and connectable with an energy source (4); a length-determining sensor (10) associated with the depth-setting member (3); a transceiver unit (7) for contactless reading of an identification of identification means connected with the fastening element (9); and a micro-controller (6) for controlling operation of the control unit (5) and connected with the transceiver unit (7) and the length-determining sensor (10) to provide for adaptive adjustment of the stop length (L).

2. A depth stop assembly according to claim 1, wherein the transceiver unit (7) is formed as one of laser scanner/light receiver unit, radio transceiver having a variable frequency, and radio transceiver unit with modulated carrier frequency, and wherein the identification means (8) is formed as one of readable bar code, film resonant circuit, and transponder.

3. A depth stop assembly according to claim 1, wherein the depth stop comprises a housing mountable on an auxiliary handle of the hand-held power tool.

4. A depth stop assembly according to claim 3, further comprising a data display (16) mounted on the housing and connected with the microprocessor (6).

5. A depth stop assembly according to claim 1, wherein the energy source (4) is integrated in the hand-held power tool, and the depth stop comprises conductor means for connecting the energy source with the control unit (5).

6. A depth stop assembly according to claim 1, wherein the energy source (4) forms part of the depth stop assembly.

7. A depth stop assembly according to claim 5, wherein the energy source (4) is integrated in an auxiliary handle (11) provided on the hand-held power tool.

8. A depth stop assembly according to claim 1, further comprising a coil (14) through which a magnetic flux produced by an energized winding (15) of the hand-held power tool (2) passes, and a power converter (13) for connecting the coil (14) with the energy source (4).

9. A fastening element insertable into a blind bore produced by a hand-held power tool (2) equipped with a depth stop assembly (1) including a rod-shaped, deflection-resistant, depth-setting member (3) supported for a limited movement parallel to an axis of the power tool; a motorized control unit (5) associated with the depth-setting member (3) and connectable with an energy source (4); a length-determining sensor (10) associated with the depth-setting member (3); a transceiver unit (7); and a micro-controller (6) for controlling operation of the control unit (5) and connected with the transceiver unit (7) and the length-determining sensor (10), the fastening element comprising identification means (8) to be read, in contactless manner, by the transceiver unit (7), whereby the depth-setting member is adjusted in accordance with a stop length (L) associated with the fastening element.

10. A fastening element according to claim 9, wherein the identification means (8) is formed as one of bar code, film resonant circuit, and transponder.

11. A method of controlling the operation of a depth stop assembly for use with a hand-held power tool (2) for setting a depth of a blind bore formed with the power tool, the depth stop comprising a rod-shaped, deflection-resistant, depth-setting member (3) supported for a limited movement parallel to an axis of the power tool and adjustable in accordance with a stop length (L) associated with a fastening element (9) insertable in the blind bore; a motorized control unit (5) associated with the depth-setting member (3) and connectable with an energy source (4); a length-determining sensor (10) associated with the depth-setting member (3); a transceiver unit (7) for contactless reading of an identification of fastening element (9) which is located in a transmission range of the transceiver unit (7); and a micro-controller (6) for controlling the operation of the control unit (5) and connected with the transceiver unit (7) and the sensor (10), the method comprising the steps of reading, with the transceiver unit (7), of the identification of the fastening element (9); and adaptively adjusting the stop length (L) in accordance with an output signal generated by the transceiver (7).

* * * * *